United States Patent [19]

Augustinas et al.

[11] Patent Number: 4,893,645

[45] Date of Patent: Jan. 16, 1990

[54] CONTROL VALVE WITH IMPROVED DUAL MODE OPERATION AND FLOW ADJUSTMENT

[75] Inventors: Andrius R. Augustinas, Peoria, Ill.; Raymond F. Lippitt, Bethesda, Md.

[73] Assignee: L. R. Nelson Corporation, Peoria, Ill.

[21] Appl. No.: 267,567

[22] Filed: Nov. 7, 1988

[51] Int. Cl.⁴ .................... F16K 43/00; F16K 31/385; F16K 31/40

[52] U.S. Cl. ................................. 137/315; 251/30.02; 251/42; 251/46; 251/148; 251/249.5; 251/285

[58] Field of Search ............... 251/30.02, 30.03, 30.04, 251/30.05, 42, 45, 46, 143, 148, 152, 60, 248, 249.5, 285; 137/315

[56] References Cited

U.S. PATENT DOCUMENTS

| | | | |
|---|---|---|---|
| 2,528,343 | 3/1950 | Davis | 285/18 |
| 2,569,734 | 7/1951 | Saalfrank | 137/315 |
| 3,008,683 | 11/1961 | Filliung et al. | 251/30.03 |
| 3,112,094 | 11/1963 | Nees et al. | 251/30.02 |
| 3,367,621 | 2/1968 | Griswold | 251/42 |
| 3,675,893 | 7/1972 | Avelines | 137/315 |
| 3,858,841 | 1/1975 | Haynes | 251/30.03 |
| 3,954,251 | 5/1976 | Callahan, Jr. et al. | 251/315 |
| 4,105,186 | 8/1978 | Eby | 251/30.02 |
| 4,135,696 | 1/1979 | Saarem et al. | 251/30.02 |
| 4,180,236 | 12/1979 | Saarem et al. | 251/30.02 |
| 4,336,918 | 10/1982 | Karbo | 251/46 |
| 4,505,450 | 8/1985 | Saarem et al. | 251/46 |
| 4,543,981 | 10/1985 | Bates et al. | 137/315 |
| 4,671,485 | 4/1987 | Saarem et al. | 251/42 |

*Primary Examiner*—George L. Walton
*Attorney, Agent, or Firm*—Cushman, Darby & Cushman

[57] ABSTRACT

A control valve in which the bonnet is removably fixedly attached to the valve body by a retained bolt and slot arrangement in such a way as to fix the marginal edge of the diaphragm main valve therebetween. The diaphragm defines with the bonnet a control chamber having an inlet control passage leading thereto from the valve body inlet and an outlet control passage leading therefrom to the valve body outlet. A control valve seat in the outlet valve seat is controlled by a solenoid plunger valve element in such a way as to afford either manual or electrical solenoid operation by virtue of a manually movable member mounting the solenoid assembly on the bonnet. An adjusting knob member is mounted by a snap fit on the bonnet in laterally offset relation with respect to both the main valve and the solenoid assembly. An adjusting member is snap fitted in fixed relation to the knob member and has a meshing gear relationship with a valve engaging element threaded on the interior of the bonnet so as to move toward and away from the main valve in response to turning movements of the knob member.

23 Claims, 3 Drawing Sheets

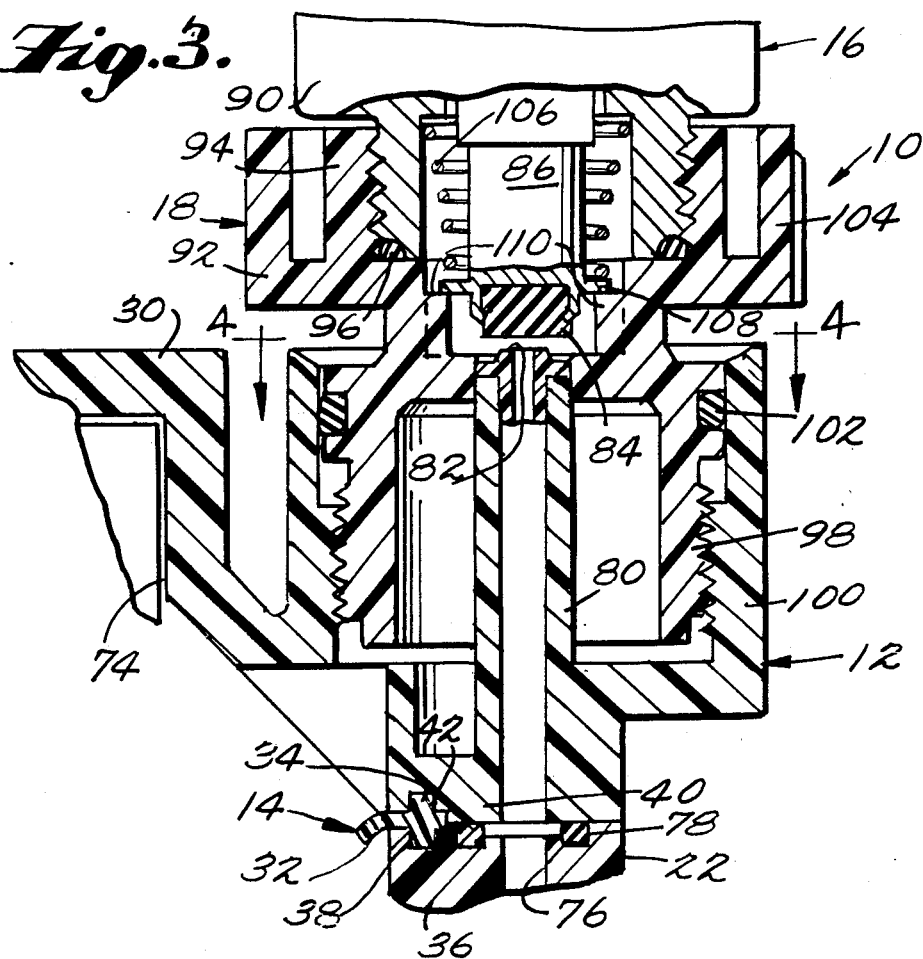
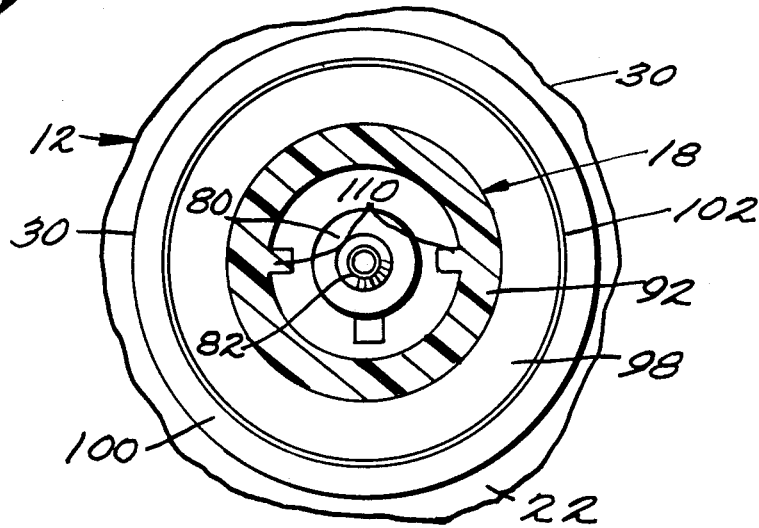

CONTROL VALVE WITH IMPROVED DUAL MODE OPERATION AND FLOW ADJUSTMENT

This invention relates to water control valves and, more particularly, to water control valves of the type controlled by solenoid operation.

Control valves of the type herein contemplated are well known and are used extensively to control lines in water irrigation and/or lawn sprinkler systems. A typical control valve includes a valve body structure having an inlet for receiving water under pressure, an outlet and a main valve seat communicating between the inlet and the outlet. A main valve is mounted in the valve body structure for movement between an engaged position with respect to the main valve seat preventing communication of the inlet with the outlet through the main valve seat and a spaced position with respect to the main valve seat allowing communication of the inlet with the outlet through the main valve seat. The main valve is connected with a diaphragm which is fixed along its marginal edge with the valve body structure so as to define with the valve body structure a control chamber. Suitable control passages are provided between the control chamber and the inlet and outlet for (1) utilizing the water under pressure communicating with the inlet to create sufficient water pressure in the control chamber to maintain the main valve in its engaged position and (2) discharging water under pressure from the control chamber to reduce the water pressure in the control chamber sufficient to enable the main valve to move into its spaced position. A typical control valve utilizes a solenoid assembly to open and close the control passage between the control chamber and the outlet.

Control valves of the type herein contemplated are usually provided with an adjusting mechanism for varying the distance which the main valve assumes from the main valve seat when in a spaced open position. In U.S. Pat. No. 4,671,485, there is disclosed a valve adjusting element threaded on a fixed portion of the valve body which is axially aligned with the main valve. The fixed portion is exteriorly threaded and the valve engaging element is interiorly threaded so as to be moved by a turning action toward and away from the main valve into different selected positions of valve engagement. In the aforesaid patent, an essential relationship is the positioning of the solenoid valve and its operating mechanism in a position concentric with both the valve engaging element and the main valve. With this arrangement, the turning of the valve engaging element requires the provision of an idler gear having exterior teeth which mesh with exterior teeth on the valve engaging element and a turnable adjusting member which is mounted within an offset opening in the valve body structure and is formed with a cap on the exterior end thereof slotted to received a screw driver. Here again, screw driver adjustment is required because of the basic necessity to mount the solenoid in a central axially aligned position with respect to the main valve.

An object of the present invention is to provide a control valve in which the solenoid assembly and adjusting mechanism are so arranged that the adjusting mechanism itself can be greatly simplified and provided with a manual knob for effecting the adjustment. In accordance with the principles of the present invention, this objective is obtained by providing a control valve of the type including a valve body and a main diaphragm valve defining a control chamber with a valve bonnet fixed to the valve body in which a control valve seat is disposed in laterally offset relation with respect to the main diaphragm valve, a solenoid assembly is mounted in a solenoid operating position generally aligned with the control valve seat and an adjusting mechanism for varying the open position of the main valve includes an annular valve engaging element threadedly engaged with the valve body structure in a position such that the valve engaging element is moved toward and away from the main valve in response to opposite turning movements of the valve engaging element, an adjusting having a meshing gear relationship with the valve engaging element so that opposite turning movements of the adjusting member are transmitted as turning movement of the valve engaging element and a manually engageable knob member disposed exteriorly of the valve body structure in laterally offset relations to the solenoid assembly and the knob member being mounted in sealed relation through the valve body structure for turning movement together. In this way, the knob member is positioned for convenient manual engagement out of the way of the solenoid assembly and the number of parts on the adjusting mechanism is reduced with respect to the patented prior art arrangement.

Preferably, the mounting of the knob member and adjusting member in the valve bonnet is a snap fitting mounting in which the adjusting member includes a first mounting portion, the knob member includes a second mounting portion, and the bonnet includes a third mounting portion defining a generally cylindrical opening extending from control interior to the exterior of the bonnet. An annular seal is disposed in surrounding relation to the interior of the opening and certain of the mounting portions provide a plurality of sets of integral resiliently flexible fingers having mounting lugs thereon. At least one set of fingers is operable to be disposed within the opening. Certain of the mounting portions include lug engaging surfaces operable in response to the movement of the knob member and the adjusting member from exterior and interior sides of the opening in a direction toward one another to an extent sufficient to dispose the one set of fingers within the opening in an operative position for (1) momentarily resiliently deflecting the fingers and (2) thereafter engaging the lugs on the fingers to retain the members in an operative position against relative movement in a direction away from one another. The adjusting member is disposed in sealing relation with the annular seal when in its operative position and is turnable in response to a manual turning movement of the knob member when in its operative position. Accordingly, it is a further object of the present invention to provide a control valve having an adjusting mechanism with a knob member and adjusting member so mounted.

. In the aforesaid patent as well as an earlier related one, namely, U.S. Pat. No. 4,505,450, the bonnet is constructed so as to carry all the working parts of the control valve. That is, the valve body is essentially a unitary fixed structure providing the inlet, the outlet and the main valve seat. Servicing of the control valve is thus facilitated by enabling the serviceman to gain ready access to all parts requiring service simply by removing the bonnet. Such an arrangement is particularly desirable in the typical underground irrigation or sprinkler set up where the valve is installed underground with the lines or pipes of the system. Since removal of the bonnet provides the serviceman access to the working parts needing service, it is important to also provide for simplicity in removing the bonnet while at the same time building in a measure of anti-vandal control. In the control valves disclosed in the two aforesaid patents a threaded ring similar to a mason jar ring is utilized to effect securement of the bonnet with the valve body. The ring is designed for manual removal which either made removal so easy that there was no anti-vandal provision or else removal became so difficult as to become an inconvenient problem.

Accordingly, it is another object of the present invention to provide a control valve of the type described having an improved mounting arrangement for the bonnet which provides a desirable compromise between anti-vandalism and service convenience. In accordance with the principles of the present invention, this objective is obtained by providing a control valve of the type described in which the valve body includes a first flanged annular portion surrounding the main valve seat providing a first annular diaphragm edge receiving surface, and the valve bonnet includes a second flanged annular portion providing a second annular diaphragm receiving edge surface. The marginal edge of the main valve diaphragm is disposed between the first and second annular diaphragm receiving surfaces. The valve body has a series of annularly spaced threaded bores formed in said first flanged annular portion thereof and a series of bolts is threaded into the threaded bores. The second flanged annular portion of the bonnet has a series of flange sections corresponding with the series of bolts. The flange sections include bolt receiving slots having open ends opening in the same annular direction. The flange sections are shaped to enable the bonnet to be moved (1) from a separated condition in a direction toward the valve body into a preliminary position of cooperation between the first and second annular diaphragm receiving surfaces wherein the bolts are disposed adjacent the open ends of the slots and (2) from the preliminary position in an annular direction into an operating position wherein the bolts are disposed in the slots in a position to be tightened onto the associated flange sections.

Preferably, the bolt heads are of hexagonal configuration and slotted so as to be turned by both wrenches and screwdrivers. Hence, a measure of anti-vandalism is provided together with the user convenience of being able to remove the bonnet without any parts such as bolts, nuts or threaded rings being fully separated.

Many control valves of the type herein contemplated also provide for a manual control of the control chamber. Such manual control may be a bleed or vent to the exterior of the control valve. In U.S. Pat. No. 4,336,918, there is disclosed an arrangement in which the mounting of the solenoid assembly is interrelated to the manual control for opening and closing the main valve. In the integrated system provided, the solenoid assembly is threadedly engaged within a mounting member which is, in turn, manually adjustably mounted on the valve body structure for turning movements in either direction between a normal solenoid operating position and a manual venting position. The mounting member includes a tubular section having one end which seats over the control passage between the control chamber and the outlet. The opposite end of the tubular section is formed with a control valve seat for engagement by the plunger of the solenoid assembly. The control chamber is communicated with the exterior of the valve seat so that when the solenoid plunger is retracted, the control chamber is communicated with the control passage to the outlet thereby opening the main valve. When the solenoid assembly is deenergized, the plunger returns to engagement with the control valve seat allowing the control chamber to be filled with pressure from the inlet side, thus closing the main valve. When the mounting member is manually moved into its vented position, the lower end of the tubular section is separated from the control passage to the outlet, thus allowing the pressure in the control chamber to vent directly through the control passage to the outlet.

The arrangement disclosed in the patent is thus somewhat complicated in that two separate valves and cooperating valve seats are provided along with two separate control passages in order to accommodate the two control modes. The integrated arrangement is desirable in that the mounting of the structure for accomplishing both modes is greatly simplified.

It is a further object of the present invention to provide an improved dual mode integrated arrangement for a control valve of the type described which achieves all of the advantages of integrated mounting and, at the same time, reduces the need heretofore required to provide dual valves, dual valve seats and dual control passages. In accordance with the principles of the present invention, this objective is obtained by providing a control valve seat for the solenoid plunger which is fixed with respect to the valve body structure and mounting the solenoid assembly on the valve body structure by a mounting member which provides for manual movement with respect to the valve body structure in water sealing relation thereto (1) from a solenoid operating position wherein the control plunger of the solenoid assembly is (a) spring biased to engage the control valve seat when in an intermediate position between the extended and retracted positions of the control plunger so as to prevent communication of the control chamber with the outlet through the control passage and (b) retractable from the intermediate position by the energization of the solenoid coil to permit communication of the control chamber with the outlet through the control passage and (2) through a range of manually controlled movement wherein the control plunger is moved by the manual movement of the solenoid assembly between engaged and spaced positions with respect to the control valve seat while being retained against spring biased movement in a position no closer to the retracted position than the intermediate position. In this way, the mounting for the solenoid assembly is simplified as in the prior art and dual control is obtained with one control valve cooperating with one control valve seat and one continuous control passage from the control chamber to the outlet.

Still another object of the present invention is the provision of a control valve of the type described which is simple in construction effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS:

FIG. 3 is a fragmentary view similar to FIG. 2 showing the solenoid assembly in its manually moved opened position; and FIG. 4 is a fragmentary sectional view taken along the line 4—4 of FIG. 2.

Figure 1:
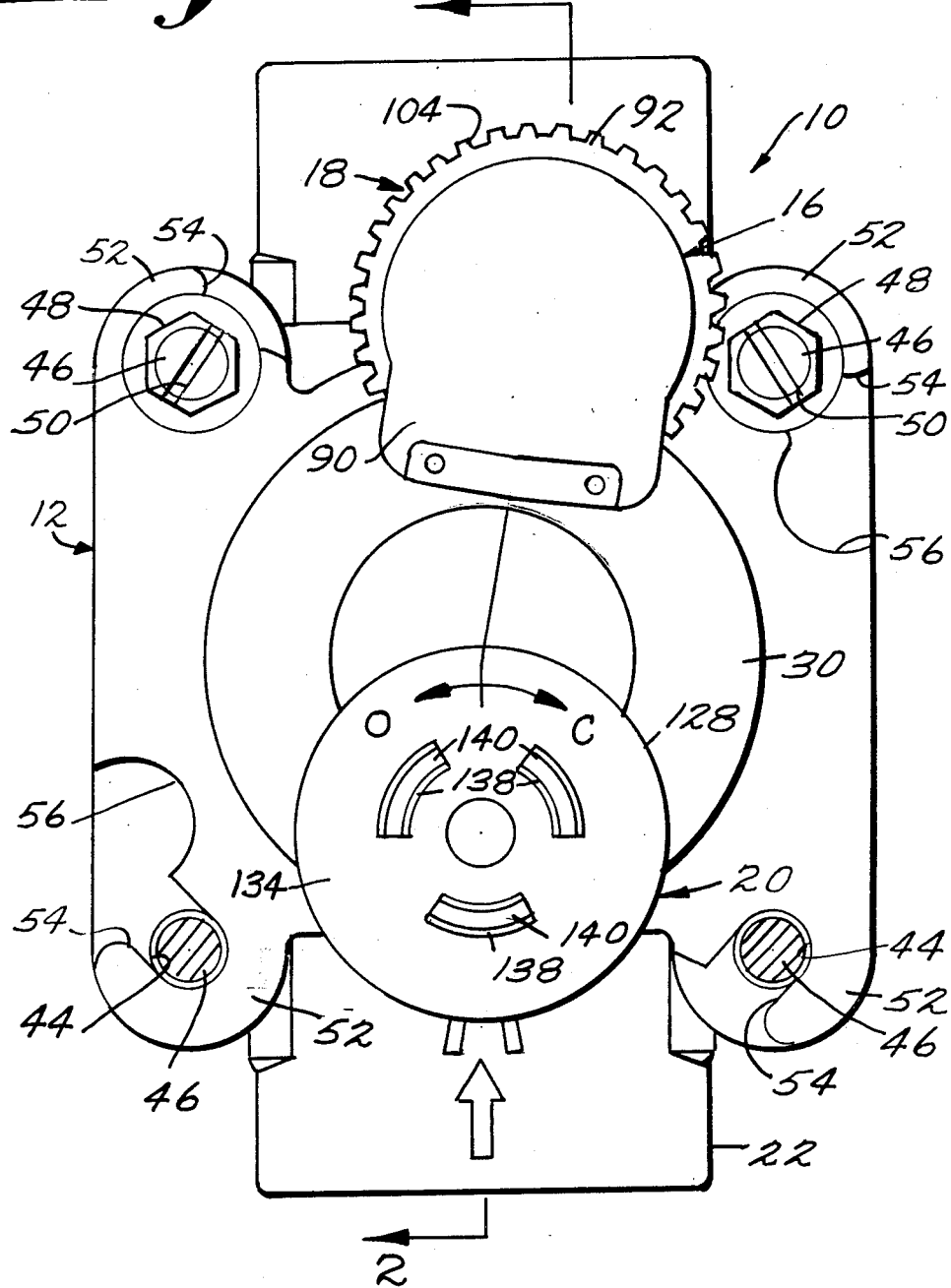
FIG. 1 is a top plan view of a control valve embodying the principles of the present invention with certain of the mounting bolts shown in cross-section for purposes of clear illustration.

Referring now more particularly to the drawings, there is shown therein a control valve, generally indicated at 10, embodying the principles of the present invention. The control valve includes, in general, a valve body structure, generally indicated at 12, having a main diaphragm valve assembly, generally indicated at 14, therein, a solenoid assembly, generally indicated at 16, a manual mounting assembly, generally indicated at 18, for the solenoid assembly 16 enabling dual mode operation of the main valve assembly 14, either by manual operation or by solenoid operation, and an adjusting mechanism, generally indicated at 20, for manually varying the distance which the main valve assembly 14 opens for the purpose of selectively determining the flow rate of water thereby.

As shown, the valve body structure 12 includes a valve body 22 which is of generally tubular configuration and is molded of plastic material so as to include an inlet 24 adapted to receive water under pressure and an axially aligned and spaced outlet 26. The valve body 22 also includes an upwardly facing main valve seat 28 communicating between the inlet 24 and the outlet 26. The valve body structure 12 also includes a valve bonnet 30 which carries the solenoid assembly 16, the manual mounting assembly 18, the adjusting mechanism 20, and, when separated from the valve body 22, also the main valve assembly 14, in short, all of the working parts of the control valve.

The main valve assembly 14 includes a diaphragm 32 having a marginal edge formed with a bead 34 of generally rectangular configuration. The valve body 22 is formed with a first flanged annular mounting portion 36 providing first annular diaphragm edge engaging surfaces 38. Similarly, the valve bonnet 30 is provided with a cooperating second flanged annular mounting portion 40 providing second annular diaphragm edge engaging surfaces 42. As shown, the bonnet diaphragm edge engaging surfaces form an annular groove of rectangular cross-section the width of which provides tight fit for one side of the rectangular diaphragm bead 34. The valve body surfaces 38 likewise form an annular groove of rectangular cross-section; however, the width is such as to loosely receive the opposite side of the bead 34. The surfaces 38 and 40 also interengage at their outer marginal periphery so as to limit the movement of the valve body and bonnet together.

As best shown in FIG. 1, the flanged annular mounting portion 36 of the valve body 22 is provided with a series of annularly spaced threaded openings 44 for threadedly receiving a corresponding series of headed bolts 46. Each bolt has a head formed with a hexagonal peripheral configuration 48 and a screwdriver receiving slot or surface 50 in the central upper portion thereof. The second flanged annular mounting portion 40 of the bonnet 30 includes a series of annularly spaced flange sections 52 each of which is formed with a slot 54 opening in the same annular direction. In two of the flanged sections 52, there is formed a circular recess 5 in communication with the associated slot 54 for the purpose of allowing the valve bonnet 30 to be moved vertically downwardly into a preliminary position wherein the bolts 46 are spaced from the slots 54. The bonnet 30 is then movable annularly in a direction to dispose the slots 54 in surrounding relation with the shanks of the bolts 46. The bolt heads are then engaged by a suitable tool either a wrench or a screwdriver and turned until tightened on the flange sections 52. In this way, the bonnet 30 is removably fixedly secured to the valve body 22 with the peripheral edge of the diaphragm 32 interengaged between the surfaces 38 and 42.

The main valve assembly 14 includes a main valve 58 which is molded integral with the central portion of the diaphragm 32, the molding including a fabric reinforcing not shown. A pair of cooperating fittings 60 and 62 are mounted on opposite sides of the main valve 58. The upper fitting 60 includes a ribbed depending portion 64 which extends through a central opening in the main valve 58 and the lower fitting 62 is suitably fixed to the depending portion 64 in engagement with the central portion of the main valve 58 therebetween. The lower fitting 62 includes a series of control openings 66 which lead to a central control passage 68 in the upper fitting 60. The upper fitting 60 is centrally apertured to receive one end of a coil spring 70, the opposite end of which seats within a recess formed in a fixed annular portion 72 on the central interior of the bonnet 30. The spring 70 serves to resiliently bias the main valve 58 into a position of engagement with the main valve seat 28 which closes off communication between the inlet 24 and the outlet 26.

The diaphragm 32 defines with the interior of the bonnet 30 a control chamber 74 which receives water from the inlet through the control passages 66 and 68. It will be noted that the water pressure entering the inlet 24 acts on the undersurface of the main valve 58 inwardly of the valve seat 28 while the water pressure in the control chamber 74 acts on the greater area of the diaphragm 32 inwardly of the surfaces 38 and 42. Consequently, when the pressure conditions within the control chamber 74 are equal to those at the inlet 24, the main valve 58 will be biased not only by the spring 70 but by the water pressure into a valve seat engaging closed position. The pressure in the control chamber 74 is controlled by communicating the same with a passage 76 formed in the valve body 22 in communication with the outlet 26 and extending through the associated flanged annular portion 36. The end of the passage 76 is surrounded by an O-ring 78 and the bonnet 30 includes a tubular portion 80 which extends upwardly therefrom, the interior of which defines a continuation of the control passage 76. Mounted in the upper end of the tubular portion 80 is an insert defining a control valve seat 82. The upper end of the valve seat 82 communicates with the control chamber 74 and this communication is, in turn, controlled by a valve element 84 on the lower end of a plunger 86 of the solenoid assembly 16. The solenoid assembly 16 also includes a solenoid coil 88 and an outer casing 90 which is necked down and provided with exterior threads.

In accordance with the principles of the present invention, the solenoid mounting assembly 18 comprises a mounting member 92 which includes an upper annular portion 94 which is internally threaded to enable the externally threaded necked portion of the solenoid casing 9 to be screwed therein in sealed relation, as by an O-ring seal 96. The mounting member 92 includes a lower portion 98 which is exteriorly threaded so as to threadedly engage within interior threads formed on an annular mounting portion 100 of the bonnet 30 which surrounds the tubular portion 80. The interior of the bonnet annular portion 100 communicates with the control chamber 74 and an upper section of the lower portion 98 of the mounting member 92 is formed with an annular groove for receiving an O-ring seal 102 which, in turn, engages a cylindrical surface formed in an upper section of the annular portion 100 of the bonnet 30. The mounting member 92 also includes an exterior manually engageable portion 104 which is provided with a suitable surface to enable a user to turn the mounting member 92 so that in response to such turning movement the threaded engagement will cause the mounting member 92 to move vertically with respect to the bonnet 30.

Figure 2:
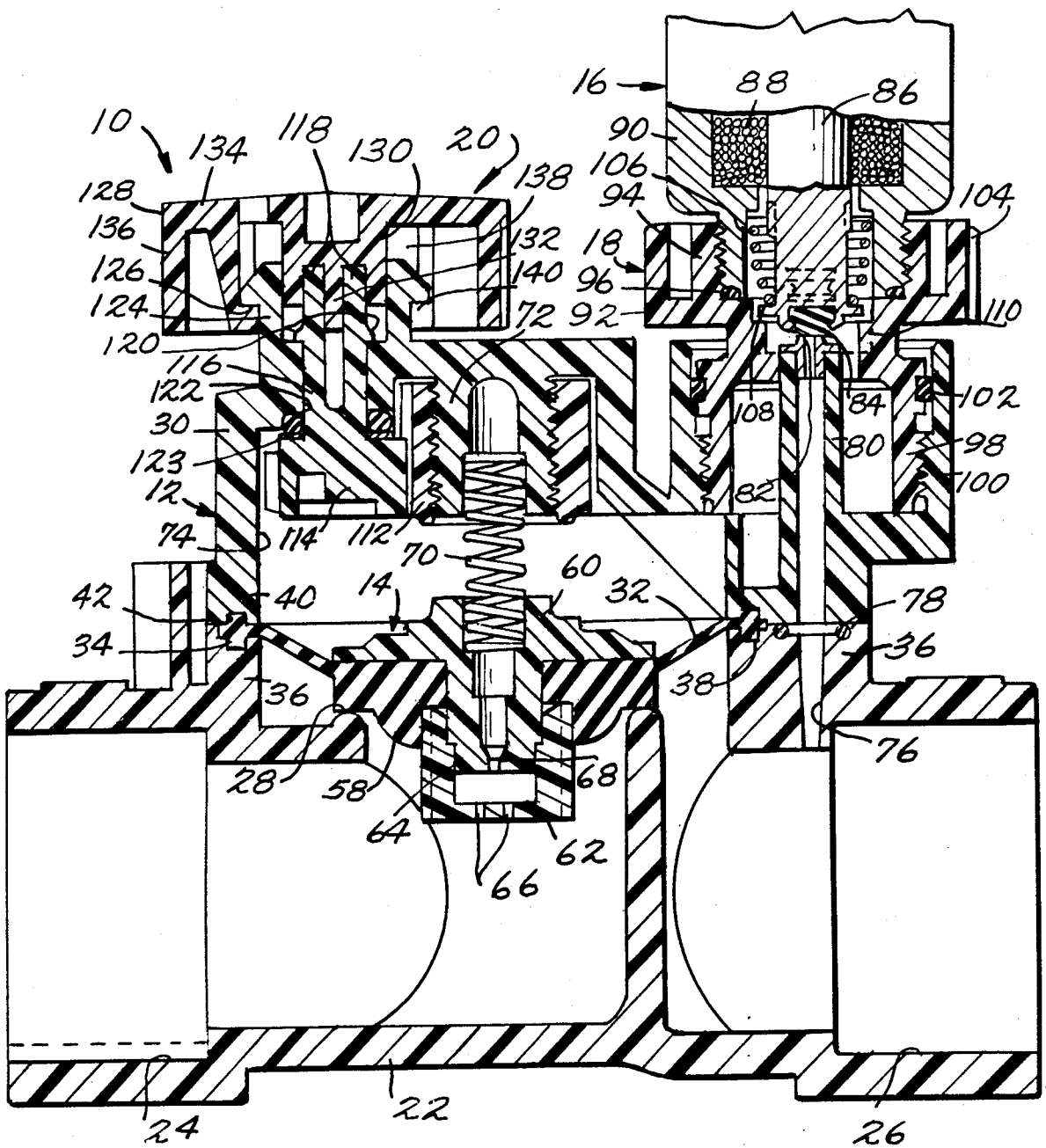
FIG. 2 is a cross-sectional view taken along the line 2—2 of FIG. 1 showing the solenoid assembly in its solenoid operating position with the plunger in its valve seat engaging position in solid lines and in its open position in dotted lines.

In the position shown in FIG. 2, the mounting member 92 is disposed in a lower solenoid operating position. As shown, the plunger 86 of the solenoid assembly 14 is spring pressed, as by a coil spring 106, to an extended position which is beyond the position shown in FIG. 2. When the coil 88 is energized, the plunger valve element 84 is retracted to a retracted position, shown in dotted lines in FIG. 2. In the solenoid operating position shown in FIG. 2, the plunger is in an intermediate position between its fully extended and fully retracted position and the plunger valve element 84 is disposed in engagement with the control valve seat 82, thus closing off communication between the control chamber 74 and the outlet 26 through control passage 76. In this position, if the solenoid coil 88 is energized, the plunger valve element 84 will move upwardly to the dotted line position thus allowing the control chamber 74 to communicate with the outlet 26 through control passage 76. It will be noted that the plunger 86 includes a radially outwardly extending flange 108 which receives the lower end of the spring 106 and that the central interior of the mounting member 92 is formed with a pair of shoulders 110 which are positioned just below the annular flange 108 when the mounting member 92 is in the position shown.

When it is desired to control the main valve manually, the operator engages the knob portion 104 and turns the mounting member 92 so that it moves upwardly. During this upward movement, the plunger spring 106 will maintain the plunger valve element 84 in engagement with the valve seat 82 until the shoulders 110 engage the plunger flange 108 after which the plunger 86 will be carried upwardly with respect to the valve seat 82 with the upward movement of the mounting member 92. The position of engagement of the shoulders 110 with the plunger flange 108 when the plunger valve element 84 is still in engagement with the valve seat 82 constitutes an upper limit solenoid operating position, there being a multiplicity of solenoid operating positions lower than that upper limit position. Above that upper limit position is a range of positions in which manual operation takes place. It will be noted that in this range of movement the plunger never moves beyond the intermediate position which it assumes when the upper limit solenoid operating position is reached.

The adjusting mechanism 20 includes a tubular valve engaging element 112 which is internally threaded so as to be threadedly engaged on exterior threads formed on the fixed central portion 72 of the bonnet 30. The valve engaging element 112 when turned with respect to the bonnet 30 in opposite directions moves toward and away from the main valve 58 and its position with respect to the main valve 58 determines the distance the main valve will move into its spaced open position. This position, in turn, determines the flow rate of water under pressure from the inlet 24 through the valve seat 28 and into the outlet 26.

The valve engaging element 112 is formed with exterior gear teeth which mesh with exterior gear teeth formed on an adjusting member 114 in the form of a gear body having a cylindrical stem or shaft portion 116 extending from one surface thereof. The stem portion is formed with a longitudinally extending slot in its free end portion which divides the end portion into a pair of integrally connected fingers 118 which are capable of resilient deflection. The fingers 118 are provided with lugs 120 on the exterior thereof having downwardly facing locking surfaces and inclined camming surfaces extending upwardly therefrom. The stem portion 116 extends through an opening 122 formed in an annular mounting portion of the bonnet 30 which is offset laterally from alignment with the main valve 58 and from the solenoid assembly 14 which is also laterally offset from the main valve.

An annular O-ring seal 123 is mounted in the mounting portion of the bonnet 30 in surrounding relation to the interior of the opening 122 which sealingly engages the stem portion 116. When the adjusting member 114 is moved upwardly through the opening 122, the cam surfaces of the lugs 120 engage the wall defining the opening 122 and resiliently deflect the fingers 118 inwardly toward one another until the locking surfaces of the lugs 120 reach the surface defining the exterior of the bonnet 30 at the exterior of the opening at which time the fingers 118 spring out and engage the locking surfaces of the lugs 120 with the exterior surface on the bonnet 30. Formed on the exterior of the bonnet 30 in surrounding relation to the opening 122 and extending upwardly therefrom is an annular wall 124 which is flanged at its upper end to define a downwardly facing annular locking surface 126 and an upwardly facing annular cam surface.

The adjusting mechanism 30 also includes a knob member 128 which includes a central hub portion 130 of a size to engage within the annular wall 124 of the bonnet 30. The knob member 128 also includes a central tab 132 which extends downwardly below the hub portion 130 in a position to engage between the spring fingers 118 when the knob member 128 is moved into operative position. As shown, the knob member 128 also includes an upper circular wall 134 having a depending manually engageable peripheral wall 136 extending downwardly therefrom. The knob member 128 also includes three arcuate fingers 138 extending downwardly from the circular wall 134 between the hub portion 130 and the peripheral wall 136. Formed on the interior lower end of the spring fingers 138 are lugs 140 having locking surfaces facing upwardly and cam surface extending therefrom downwardly. The circular wall of the knob member is formed with arcuate openings which enable the spring fingers and the lugs to be molded of a plastic material in one piece.

It will be understood that when the knob member 128 is moved downwardly toward the bonnet 30, with the adjusting member 114 in position as previously indicated, the central tab 132 enters between the fingers 118 of the adjusting member 114 thus preventing the fingers 118 from resiliently movement inwardly toward one another. The hub portion 130 engages within the bonnet annular wall 124 and the cam surfaces on the lugs 120 of the fingers 118 engage the cam surface of the flanged wall 124 thus resiliently deflecting the fingers 118 radially outwardly until the locking surfaces of the lugs 120 engage beneath the locking surface 126 of the flanged wall 124. In this position, the two members 114 and 128 are mounted within the bonnet 30 for turning or rotational movement together and in sealing relation with the bonnet 30.

It will be understood that turning movements applied manually to the knob member 128 will, in turn, cause like movements to the adjusting member 114 which, by virtue of the meshing teeth relationship with the valve engaging element 112, will cause a turning movement of the latter. As previously indicated, turning movements of the valve engaging element 112 results in a movement of the valve engaging element 112 toward and away from the main valve 58 into a selected position which will vary the flow rate through the main valve seat 28 and into the outlet 26.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A control valve comprising
   a valve body having an inlet for receiving water under pressure, an outlet, and a main valve seat communicating between said inlet and said outlet,
   a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat,
   said main valve having a diaphragm connected therewith and extending outwardly therefrom,
   a valve bonnet fixed to said valve body and engaging a marginal edge of said diaphragm therebetween so that said diaphragm defines with said valve bonnet a control chamber,
   pressure control means operatively associated with said control chamber and said inlet and outlet for (1) utilizing the water under pressure communicating with said inlet to create sufficient water pressure in said control chamber to maintain said main valve in said engaged position and (2) for discharging water under pressure from said control chamber to said outlet to reduce the water pressure in said control chamber sufficient to enable said main valve to move into said spaced position,
   said control means comprising control passage means from said control chamber to said outlet having a control valve seat therein disposed in laterally offset relation with respect to said main valve,
   a solenoid assembly including a control plunger spring biased toward an extended position and a solenoid coil means energizable to retract said control plunger from said extended position against the spring bias thereof into a spaced retracted position,
   means mounting said solenoid assembly on said bonnet for manual movement in water sealing relation through a range of manually controlled movement and into and out of a solenoid operating position generally aligned with said control valve seat wherein said control plunger is (1) spring biased to engage said control valve seat when in an intermediate position between said extended and retracted positions so as to prevent communication of said control chamber with said outlet through said control passage means and (2) retractable from said intermediate position by the energization of said solenoid coil means to permit communication of said control chamber with said outlet through said control passage means,
   means defining an exterior manually engageable knob for effecting manual movement of said solenoid assembly into and out of said solenoid operating position and through said range of manually controlled movement,
   means operable when said solenoid assembly is moved through said range of manually controlled movement by said manually engageable knob defining means for communicating said control chamber with said outlet and rendering said control plunger inoperable to control the same, and
   an adjusting mechanism carried by said bonnet for manual movement into selected positions for selectively varying the distance between said main valve and said main valve seat when said main valve is in said spaced position,
   said adjusting mechanism comprising an annular valve engaging element threadedly engaged with said bonnet in a position such that said valve engaging element is moved toward and away from said main valve in response to opposite turning movements of said valve engaging element,
   an adjusting member within said control chamber having a meshing gear relationship with said valve engaging element so that opposite turning movements of said adjusting member are transmitted as turning movements of said valve engaging element,
   a manually engageable knob member disposed exteriorly of said bonnet in laterally offset relation to said solenoid assembly, and
   means for mounting said knob member and said adjusting member in sealed relation through said bonnet for turning movements together,
   said exterior manually engageable knob defining means and said manually engageable knob member being mounted at opposite end portions of said bonnet in a laterally spaced relation sufficient to enable each to be conveniently manually engaged and moved without interference from the other.

2. A control valve as defined in claim 1 wherein said means operable when said solenoid assembly is within said range of manually controlled movement is operable to effect movement of said control plunger by the manual movement of the solenoid assembly between engaged and spaced positions with respect to said control valve seat while being retained against spring biased movement in a position no closer to said retraction position than said intermediate position.

3. A control valve as defined in claim 2 wherein said solenoid assembly mounting means comprises an annular solenoid mounting member having an upper annular portion for fixedly sealingly receiving said solenoid assembly, said valve bonnet including an annular solenoid mounting portion having (1) a lower interior threaded surface and (2) an upper interior generally cylindrical surface, said annular solenoid mounting member including a lower annular portion having (1) a lower exterior threaded surface disposed in threadedly engaged relation with the interior threaded surface of said annular solenoid mounting portion and (2) an upper O-ring seal mounted in the exterior thereof in slidably sealed relation with the cylindrical surface of said solenoid mounting portion.

4. A control valve as defined in claim 3 wherein said control valve seat is formed on the upper end of a tubular portion of said valve bonnet disposed concentrically within the annular solenoid mounting portion thereof, said mounting means further including interior abutments on said solenoid mounting member between the upper and lower annular portions thereof.

5. A control valve comprising
   a valve body having an inlet for receiving water under pressure, an outlet, and a main valve seat communicating between said inlet and said outlet,
   a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat,
   said main valve having a diaphragm connected therewith and extending outwardly therefrom,
   a valve bonnet fixed to said valve body and engaging a marginal edge of said diaphragm therebetween so that said diaphragm defines with said valve bonnet a control chamber,
   pressure control means operatively associated with said control chamber and said inlet and outlet for (1) utilizing the water under pressure communicating with said inlet to create sufficient water pressure in said control chamber to maintain said main valve in said engaged position and (2) for discharging water under pressure from control chamber to said outlet to reduce the water pressure in said control chamber sufficient to enable said main valve to move into said spaced position,
   said control means comprising control passage means from said control chamber to said outlet having a control valve seat therein disposed in laterally offset relation with respect to said main valve,
   a solenoid assembly including a control plunger spring biased toward an extended position and a solenoid coil means energizable to retract said control plunger from said extended position against the spring bias thereof into a spaced retracted position,
   means mounting said solenoid assembly on said bonnet in a solenoid operating position generally aligned with said control valve seat wherein said control plunger is (1) spring biased to engage said control valve seat when in an intermediate position between said extended and retracted positions so as to prevent communication of said control chamber with said outlet through said control passage means and () retractable from said intermediate position by the energization of said solenoid coil means to permit communication of said control chamber with said outlet through said control passage means, and
   an adjusting mechanism carried by said bonnet for manual movement into selected positions for selectively varying the distance between said main valve and said main valve seat when said main valve is in said spaced position,
   said adjusting mechanism comprising an annular valve engaging element threadedly engaged with said bonnet in a position such that said valve engaging element is moved toward and away from said main valve in response to opposite turning movements of said valve engaging element,
   an adjusting member within said control chamber having a meshing gear relationship with said valve engaging element so that opposite turning movements of said adjusting member are transmitted as turning movements of said valve engaging element,
   a manually engageable knob member disposed exteriorly of said bonnet in laterally offset relation to said solenoid assembly, and
   means for mounting said knob member and said adjusting member in sealed relation through said bonnet for turning movements together,
   said knob member mounting means comprising
   a first knob mounting portion on said adjusting member,
   a second knob mounting portion on said knob member,
   a third knob mounting portion on said valve bonnet defining a generally cylindrical opening extending from the interior to the exterior of said bonnet,
   an annular seal surrounding the interior of said opening,
   certain of said knob mounting portions providing a plurality of sets of integral resiliently flexible fingers having mounting lugs thereon,
   at least one set of fingers being disposable within said opening, certain of said knob mounting portions including lug engaging surface means operable in response to the movement of said knob member and said adjusting member from the exterior and the interior of said opening in a direction toward one another to an extent sufficient to dispose said one set of fingers within said opening in an operative position for (1) momentarily resiliently deflecting said fingers and (2) thereafter engaging the lugs on said fingers to retain said members in an operative position against relative movement in a direction away from one another,
   said adjusting member being disposed in sealing relation with said annular seal when in said operative position.

6. A control valve as defined in claim 2 wherein said first knob mounting portion provides a first set of fingers constituting said one set of fingers, said third knob mounting portion having first lug engaging surface means for cooperating with first lugs on the exterior of said first set of fingers including a cylindrical surface defining said opening and an outwardly facing annular surface surrounding the exterior marginal edge of said opening.

7. A control valve as defined in claim 3 wherein the second knob mounting portion includes a section adapted to enter between said first set of fingers when said knob and adjusting members are in their operative position so as to prevent further resilient deflection of said first set of fingers.

8. A control valve as defined in claim 4 wherein said second knob mounting portion provides a second set of fingers, said third knob mounting portion having second lug engaging surface means for cooperating with second lugs on the interior of said second set of fingers including an inwardly facing annular locking surface disposed in outwardly surrounding relation with respect to said opening and an annular inclined cam surface leading thereto.

9. A control valve as defined in claim 5 wherein said solenoid assembly mounting means also serves to mount said solenoid assembly on said valve bonnet for manual movement in water sealing relation thereto from said solenoid operating position through a range of manually controlled movement wherein said control plunger is moved by the manual movement of the solenoid assembly between engaged and spaced positions with respect to said control valve seat while being retained against spring biased movement in a position no closer to said retracted position than said intermediate position.

10. A control valve as defined in claim 6 wherein said solenoid assembly mounting means comprises an annular solenoid mounting member having an upper annular portion for fixedly sealingly receiving said solenoid assembly, said valve bonnet including an annular solenoid mounting portion having (1) a lower interior threaded surface and (2) an upper interior generally cylindrical surface, said annular solenoid mounting member including a lower annular portion having (1) a lower exterior threaded surface disposed in threadedly engaged relation with the interior threaded surface of said annular solenoid mounting portion and (2) an upper O-ring seal mounted in the exterior thereof in slidably sealed relation with the cylindrical surface of said solenoid mounting portion.

11. A control valve as defined in claim 7 wherein said control valve seat is formed on the upper end of a tubular portion of said valve bonnet disposed concentrically within the annular solenoid mounting portion thereof, said mounting means further including interior abutments on said solenoid mounting member between the upper and lower annular portions thereof.

12. A control valve as defined in claim 8 wherein said valve body includes a first flanged annular portion surrounding said main valve seat providing a first annular diaphragm edge receiving surface, said valve bonnet having a second flanged annular portion providing a second annular diaphragm edge receiving surface, the marginal edge of said diaphragm being disposed between said first and second annular diaphragm receiving surfaces, said valve body having a series of annularly spaced threaded bores formed in said first flanged annular portion thereof, a series of bolts threaded into said threaded bores, the second flanged annular portion of said bonnet having a series of flange sections corresponding with the series of bolts, said flange sections including bolt receiving slots having open ends opening in the same annular direction, said flange section being shaped to enable said bonnet to be moved (1) from a separated condition in a direction toward said valve body into a preliminary position of cooperation between said first and second annular diaphragm receiving surfaces wherein said bolts are disposed adjacent the open ends of said slots and (2) from said preliminary position in an annular direction into an operating position wherein said bolts are disposed in said slots in a position to be tightened onto the associated flange sections.

13. A control valve as defined in claim 6 wherein said control valve seat is formed on the upper end of a tubular portion of said body structure disposed concentrically within the annular solenoid mounting portion thereof, said mounting means further including interior abutments on said solenoid mounting member between the upper and lower annular portions thereof.

14. A control valve as defined in claim 13 wherein said valve body structure includes (1) a valve body defining said inlet, said outlet and said main valve seat and having a first flanged annular portion surrounding said valve seat providing a first annular diaphragm receiving surface and (2) a valve bonnet having a second flanged annular portion providing a second annular diaphragm receiving surface, said main valve including an annular flexible diaphragm having an annular marginal edge portion disposed between said first and second annular diaphragm receiving surfaces, said chamber defining means including interior surfaces on said bonnet inwardly of said second annular diaphragm receiving surface and a contiguous surface of said diaphragm inwardly of said annular marginal edge portion, said valve body having a series of annularly spaced threaded bores formed in said first flanged annular portion thereof, a series of bolts threaded into said threaded bores, the second flanged annular portion of said bonnet having a series of flange sections corresponding with the series of bolts, said flange sections including bolt receiving slots having open ends opening in the same annular direction, said flanged sections being shaped to enable said bonnet to be moved (1) from a separated condition in a direction toward said valve body into a preliminary position of cooperation between said first and second annular diaphragm receiving surfaces wherein said bolts are disposed adjacent the open ends of said slots and (2) from said preliminary position in an annular direction into an operating position wherein said bolts are disposed in said slots in a position to be tightened onto the associated flange sections.

15. A control valve comprising
a valve body having an inlet for receiving water under pressure, an outlet, and a main valve seat communicating between said inlet and said outlet,
a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat,
said main valve having a diaphragm connected therewith and extending outwardly therefrom,
a valve bonnet fixed to said valve body and engaging a marginal edge of said diaphragm therebetween so that said diaphragm defines with said valve bonnet a control chamber,
pressure control means operatively associated with said control chamber and said inlet and outlet for (1) utilizing the water under pressure communicating with said inlet to create sufficient water pressure in said control chamber to maintain said main valve in said engaged position and (2) for discharging water under pressure from control chamber to said outlet to reduce the water pressure in said control chamber sufficient to enable said main valve to move into said spaced position, said control means comprising control passage means from said control chamber to said outlet having a control valve seat therein disposed in laterally offset relation with respect to said main valve, a solenoid assembly including a control plunger spring biased toward an extended position and a solenoid coil means energizable to retract said control plunger from said extended position against the spring bias thereof into a spaced retracted position, means mounting said solenoid assembly on said bonnet in a solenoid operating position generally aligned with said control valve seat wherein said control plunger is (1) spring biased to engage said control valve seat when in an intermediate position between said extended and retracted positions so as to prevent communication of said control chamber with said outlet through said control passage means and (2) retractable from said intermediate position by the energization of said solenoid coil means to permit communication of said control chamber with said outlet through said control passage means, and an adjusting mechanism carried by said bonnet for manual movement into selected positions for selectively varying the distance between said main valve and said main valve seat when said main valve is in said spaced position, said adjusting mechanism comprising an annular valve engaging element threadedly engaged with said bonnet in a position such that said valve engaging element is moved toward and away from said main valve in response to opposite turning movements of said valve engaging element, an adjusting member within said control chamber having a meshing gear relationship with said valve engaging element so that opposite turning movements of said adjusting member are transmitted as turning movements of said valve engaging element, a manually engageable knob member disposed exteriorly of said bonnet in laterally offset relation to said solenoid assembly, and means for mounting said knob member and said adjusting member in sealed relation through said bonnet for turning movements together, said valve body including a first flanged annular portion surrounding said main valve seat providing a first annular diaphragm edge receiving surface, said valve bonnet having a second flanged annular portion providing a second annular diaphragm edge receiving surface, the marginal edge of said diaphragm being disposed between said first and second annular diaphragm receiving surfaces, said valve body having a series of annularly spaced threaded bores formed in said first flanged annular portion thereof, a series of bolts threaded into said threaded bores, the second flanged annular portion of said bonnet having a series of flange sections corresponding with the series of bolts, said flange sections including bolt receiving slots having open ends opening in the same annular direction, said flange section being shaped to enable said bonnet to be moved (1) from a separated condition in a direction toward said valve body into a preliminary position of cooperation between said first and second annular diaphragm receiving surfaces wherein said bolts are disposed adjacent the open ends of said slots and (2) from said preliminary position in an annular direction into an operating position wherein said bolts are disposed in said slots in a position to be tightened onto the associated flange sections.

16. A control valve comprising a valve body structure having an inlet for receiving water under pressure, an outlet, and a main valve seat communicating between said inlet and said outlet, a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat, means defining a main control chamber within said valve body structure having a pressure responsive diaphragm relationship with said main valve and pressure control means operatively associated with said control chamber and said inlet and outlet for (1) utilizing the water under pressure communicating with said inlet to create sufficient water pressure in said control chamber to maintain said main valve in said engaged position and (2) discharging water under pressure from said control chamber to said outlet to reduce the water pressure in said control chamber sufficient to enable said main valve to move into said spaced position, said control means comprising control passage means from said control chamber to said outlet having a control valve seat therein fixed with respect to said valve body structure, a solenoid assembly including a control plunger spring biased toward an extended position and a solenoid coil means energizable to retract said control plunger from said extended position against the spring bias thereof into a spaced retracted position, and means mounting said solenoid assembly on said valve body structure for manual movement in water sealing relation thereto (1) from a solenoid operating position wherein said control plunger is (A) spring biased to engage said control valve seat when in an intermediate position between said extended and retracted positions so as to prevent communication of said control chamber with said outlet through said control passage means and (B) retractable from said intermediate position by the energization of said solenoid coil means to permit communication of said control chamber with said outlet through said control passage means and (2) through a range of manually controlled movement wherein said control plunger is moved by the manual movement of the solenoid assembly between engaged and spaced positions with respect to said control valve seat while being retained against spring biased movement in a position no closer to said retracted position than said intermediate position.

17. A control valve as defined in claim 16 wherein said solenoid mounting means comprises an annular solenoid mounting member having an upper annular portion for fixedly sealingly receiving said solenoid assembly, said valve body structure including an annular solenoid mounting portion having (1) a lower interior threaded surface and (2) an upper interior generally cylindrical surface, said annular solenoid mounting member including a lower annular portion having (1) a lower exterior threaded surface disposed in threadedly engaged relation with the interior threaded surface of said annular mounting portion and (2) an upper O-ring seal mounted in the exterior thereof in slidably sealed relation with the cylindrical surface of said mounting portion.

18. A control valve comprising
a valve body structure having an inlet for receiving water under pressure, an outlet, and a main valve seat communicating between said inlet and said outlet,
a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat,
means defining a main control chamber within said valve body structure having a pressure responsive diaphragm relationship with said main valve and
pressure control means operatively associated with said control chamber and said inlet and outlet for (1) utilizing the water under pressure communicating with said inlet to create sufficient water pressure in said control chamber to maintain said main valve in said engaged position and (2) for discharging water under pressure from said control chamber to said outlet to reduce the water pressure in said control chamber sufficient to enable said main valve to move into said spaced position,
said control means comprising control passage means from said control chamber to said outlet having a control valve seat therein,
a solenoid assembly including a control plunger spring biased toward an extended position and a solenoid coil means energizable to retract said control plunger from said extended position against the spring bias thereof into a spaced retracted position,
means mounting said solenoid assembly on said valve body structure in a solenoid operating position wherein said control plunger is (1) spring biased to engage said control valve seat when in an intermediate position between said extended and retracted positions so as to prevent communication of said control chamber with said outlet through said control passage means and (2) retractable from said intermediate position by the energization of said solenoid coil means to permit communication of said control chamber with said outlet through said passage means, and
an adjusting mechanism mounted therein for manual movement into selected positions for selectively varying the distance between said main valve and said valve seat when said main valve is in said spaced position,
said adjusting mechanism comprising
an adjusting member including a first mounting portion,
a manually engageable knob member including a second mounting portion,
said valve body structure including a third mounting portion defining a generally cylindrical opening extending from said control chamber to the exterior of said valve body structure,
an annular seal surrounding the interior of said opening,
certain of said mounting portions providing a plurality of sets of integral resiliently flexible fingers having mounting lugs thereon,
at least one set of fingers being disposable within said opening,
certain of said mounting portions including lug engaging surface means operable in response to the movement of said knob member and said adjusting member from exterior and interior sides of said opening in a direction toward one another to an extent sufficient to dispose said one set of fingers within said opening in an operative position for (1) momentarily resiliently deflecting said fingers and (2) thereafter engaging the lugs on said fingers to retain said members in an operative position against relative movement in a direction away from one another,
said adjusting member being disposed in sealing relation with said annular seal when in said operative position and being turnable in response to a manual turning movement of said knob member when in said operative position.

19. A control valve as defined in claim 18 wherein the first mounting portion of said adjusting member provides a first set of fingers constituting said one set of fingers, the third mounting portion having first lug engaging surface means for cooperating with said first lugs on the exterior of said first set of fingers including a cylindrical surface defining said opening and an outwardly facing annular surface surrounding the exterior marginal edge of said opening.

20. A control valve as defined in claim 19 wherein the second mounting portion of said knob member includes a section adapted to enter between said first set of fingers when said members are in their operative position so as to prevent further resilient deflection of said first set of fingers.

21. A control valve as defined in claim 20 wherein said second mounting portion provides a second set of fingers, said third portion having second lug engaging surface means for cooperating with second lugs on the interior of said second set of fingers including an inwardly facing annular locking surface disposed in outwardly surrounding relation with respect to said opening and an annular inclined cam surface leading thereto.

22. A control valve comprising
a valve body having an inlet for receiving water under pressure, an outlet, a main valve seat communicating between said inlet and said outlet and a first flanged annular mounting portion surrounding said main valve seat providing a first annular diaphragm edge receiving surface means,
a main valve mounted in said valve body structure for movement between an engaged position with respect to said main valve seat preventing communication of said inlet with said outlet through said main valve seat and a spaced position with respect to said main valve seat allowing communication of said inlet with said outlet through said main valve seat,
said main valve having a diaphragm connected therewith and extending outwardly therefrom, a valve bonnet having a second flanged annular mounted portion providing a second annular diaphragm edge receiving surface means means for removably securing said valve bonnet on said valve body with a marginal edge of said diaphragm engaged between the first and second flanged annular diaphragm edge receiving surface means so that said diaphragm defines with said valve bonnet a control chamber, pressure control means operatively associated with said control chamber and said inlet and outlet for (1) utilizing the water under pressure communicating with said inlet to create sufficient water pressure in said control chamber to maintain said main valve in said engaged position and (2) for discharging water under pressure from said control chamber to said outlet to reduce the water pressure in said control chamber sufficient to enable said main valve to move into said spaced position, said control means comprising control passage means from said control chamber to said outlet having a control valve seat therein, a solenoid assembly including a control plunger spring biased toward an extended position and a solenoid coil means energizable to retract said control plunger from said extended position against the spring bias thereof into a spaced retracted position, means mounting said solenoid assembly on said bonnet in a solenoid operating position wherein said control plunger is (1) spring biased to engage said control valve seat when in an intermediate position between said extended and retracted positions so as to prevent communication of said control chamber with said outlet through said control passage means and (2) retractable from said intermediate position by the energization of said solenoid coil means to permit communication of said control chamber with said outlet through said control passage means, and an adjusting mechanism carried by said bonnet for manual movement into selected positions for selectively varying the distance between said main valve and said main valve seat when said main valve is in said spaced position, said bonnet mounting means comprising:

said first flanged annular mounting portion having a series of annularly spaced threaded bores formed therein, a series of headed bolts threaded into said threaded bores, the second flanged annular mounting portion of said bonnet having a series of flange sections corresponding with the series of bolts, said flange sections including bolt receiving slots having open ends opening in the same annular direction and being shaped to enable said bonnet to be moved (1) from a separated condition in a direction toward said valve body into a preliminary position of cooperation between said first and second annular diaphragm receiving surface means wherein said bolt are disposed adjacent the open ends of said slots and (2) from said preliminary position in an annular direction into an operating position wherein said bolts are disposed in said slots in positions to be tightened onto the associated flange sections.

23. A control valve as defined in claim 22 wherein each of said bolts has a head of hexagonal peripheral configuration formed with a screwdriver slot in the upper surface thereof.

* * * * *